US008397768B2

(12) United States Patent
Benik

(10) Patent No.: US 8,397,768 B2
(45) Date of Patent: Mar. 19, 2013

(54) STATIC SENSING FUEL PUMP LEVER BRACE

(76) Inventor: Nicholas A Benik, Brooklyn, NY (US)

( * ) Notice: Subject to any disclaimer, the term of this patent is extended or adjusted under 35 U.S.C. 154(b) by 465 days.

(21) Appl. No.: 12/687,778

(22) Filed: Jan. 14, 2010

(65) Prior Publication Data

US 2011/0168295 A1 Jul. 14, 2011

(51) Int. Cl.
*B65B 1/04* (2006.01)
*F16K 35/00* (2006.01)

(52) U.S. Cl. ............................ 141/94; 141/392; 251/90

(58) Field of Classification Search .................... 141/94, 141/392; 251/90; 340/657
See application file for complete search history.

(56) References Cited

U.S. PATENT DOCUMENTS 4,210,181 A * 7/1980 Clevenger .................... 141/392
4,245,682 A * 1/1981 Agnew, Sr. .................. 141/392
4,278,116 A * 7/1981 Opp ............................ 141/392
4,934,419 A * 6/1990 Lamont et al. ................. 141/94
5,159,523 A * 10/1992 Claassen et al. .............. 361/215
5,267,670 A * 12/1993 Foster .............................. 222/1
5,463,379 A * 10/1995 Campbell et al. ............. 340/657
5,720,327 A * 2/1998 Foster, Jr. ...................... 141/207
5,832,968 A * 11/1998 Leary ............................. 141/94
6,070,625 A * 6/2000 Robinson et al. ............. 141/392
6,209,592 B1 * 4/2001 Gilboa et al. .................. 141/94
6,334,474 B1 * 1/2002 Rababy et al. ................ 141/207

* cited by examiner

*Primary Examiner* — Timothy L Maust

(57) ABSTRACT

A removable brace wedges between a fuel nozzle activating lever and the nozzle handle finger guard. A static electricity sensing circuit has antennas on both protruding sides of the brace. Visual and audible warning signals activate when a user approaches the nozzle with an electrostatic charge in the user's body. Light emitting diodes in upwardly extending protruding side portions are highly visible. A piezo-electric sounding device gives a loud warning. A magnet enables the brace to be attached to a metal part of the vehicle, such as inside the fuel cover door, when not in use.

12 Claims, 2 Drawing Sheets

STATIC SENSING FUEL PUMP LEVER BRACE

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to holding devices for fuel nozzle handle levers and in particular to a removable retainer device for an activating lever on a fuel pump nozzle handle having a static electricity detection element and warning signal to prevent fires or explosions of combustible fumes by warning a user not to touch the fuel pump handle, thereby preventing static electricity sparks caused by contact of the users hand with the fuel pump nozzle handle.

2. Description of Related Art including information disclosed under 37 CFR 1.97 and 1.98

It is convenient and often necessary for a user at a fuel pump to activate a device for holding the fuel nozzle handle lever in the on position while a user attends to other matters on or around the vehicle or at the location of the fuel pump or the user finds it necessary to get back into the vehicle due to harsh weather conditions.

There are a number of cases each year in which fuel fires or explosions result from fuel fumes ignition started by static electricity sparks caused by contact of a users hand with the fuel pump nozzle handle. This is usually caused by a user entering the vehicle during fueling and then sliding out of the seat of the vehicle producing static electricity potential in the body of the user. If the user generates a spark when attempting to grasp the fuel pump nozzle handle it may ignite fuel fumes. The static electricity potential in the body of the user can be eliminated by the user contacting the roof of the vehicle upon exiting the vehicle, but most people are not aware of the static electricity potential.

Some states have made laws against lever holding devices built into the fuel nozzle handles, but this is not convenient for the user desiring to have the fuel pumped automatically.

Many attempts have been made to eliminate the fumes using various devices or configurations of the fuel pump nozzle.

The prior art fails to provide a safe means for a user to pump gas automatically while eliminating the possibility of a fire or explosion due to ignition of fuel fumes by static electricity.

Prior art patents include U.S. Pat. Nos. 6,418,988 ; 6,095,173; D357,399 ; U.S. Pat. Nos. 4,095,629; 4,175,595; 4,200,128; 5,199,474; 4,201,253; 4,200,943; 4,210,181; 4,216,807; 4,236,552; 4,275,776; 4,278,116; 4,287,736; 4,334,560; 4,337,917; 4,408,791; 4,544,007; 4,644,984; 4,683,923; 4,690,182; 4,712,766; 4,722,375; 4,802,516; 4,811,765; 4,874,151; 5,040,769; 5,077,850; 5,118,074; 5,199,474; 5,217,054; 5,240,226; 5,517,732; 5,595,367; 5,752,554; 6,070,625; 6,227,266; 6,279,621; 6,830,086; 6,832,636; 7,040,361; and D570,198 .

What is needed is a removable retainer device for maintaining the fuel pump nozzle activating lever in the fuel pumping position, the device having a static electricity detection element and warning signals to warn a user having static electricity potential not to touch the fuel pump handle to prevent fuel fires or explosions from combustible vapor ignition started by static electricity sparks caused by contact of a users hand with the fuel pump nozzle handle.

BRIEF SUMMARY OF THE INVENTION

An object of the present invention is to provide a removable retainer device for maintaining the fuel pump nozzle activating lever in the fuel pumping position, the device having a static electricity detection element and warning signals for when a user's hand approaches the fuel nozzle handle, if the user's body has electrostatic potential, to warn the user to touch the roof of the vehicle to remove the static electrical charge to prevent fuel fires or explosions from combustible vapors or fuel fumes ignition started by static electricity sparks caused by contact of a user's electrostatically charged hand with the fuel pump nozzle handle.

Another object of the present invention is to provide a magnet means for storing the present invention attached to the vehicle when not in use.

In brief, the present invention comprises a removable brace for maintaining a fuel nozzle activating lever in the fuel pumping position having a static electricity sensing circuit and antennas built in to activate visual and audible warning signals when a user approaches the nozzle with an electrostatic charge in the user's body. Light emitting diodes in upwardly extending protruding side portions are highly visible. A piezo-electric sounding device gives a loud warning. A magnet enables the brace to be attached to a metal part of the vehicle, such as inside the fuel cover door when not in use.

The advantage of the present invention is that it provides both visual and audible warnings when a user's hand approaches the fuel nozzle handle, if the user's body has electrostatic potential, to warn the user to touch the roof of the vehicle to remove the static electrical charge to prevent fuel fires or explosions from ignition of combustible vapors or fuel fumes started by static electricity sparks caused by contact of a user's electrostatically charged hand with the fuel pump nozzle handle.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings.

DETAILED DESCRIPTION OF THE INVENTION

Figure 1:
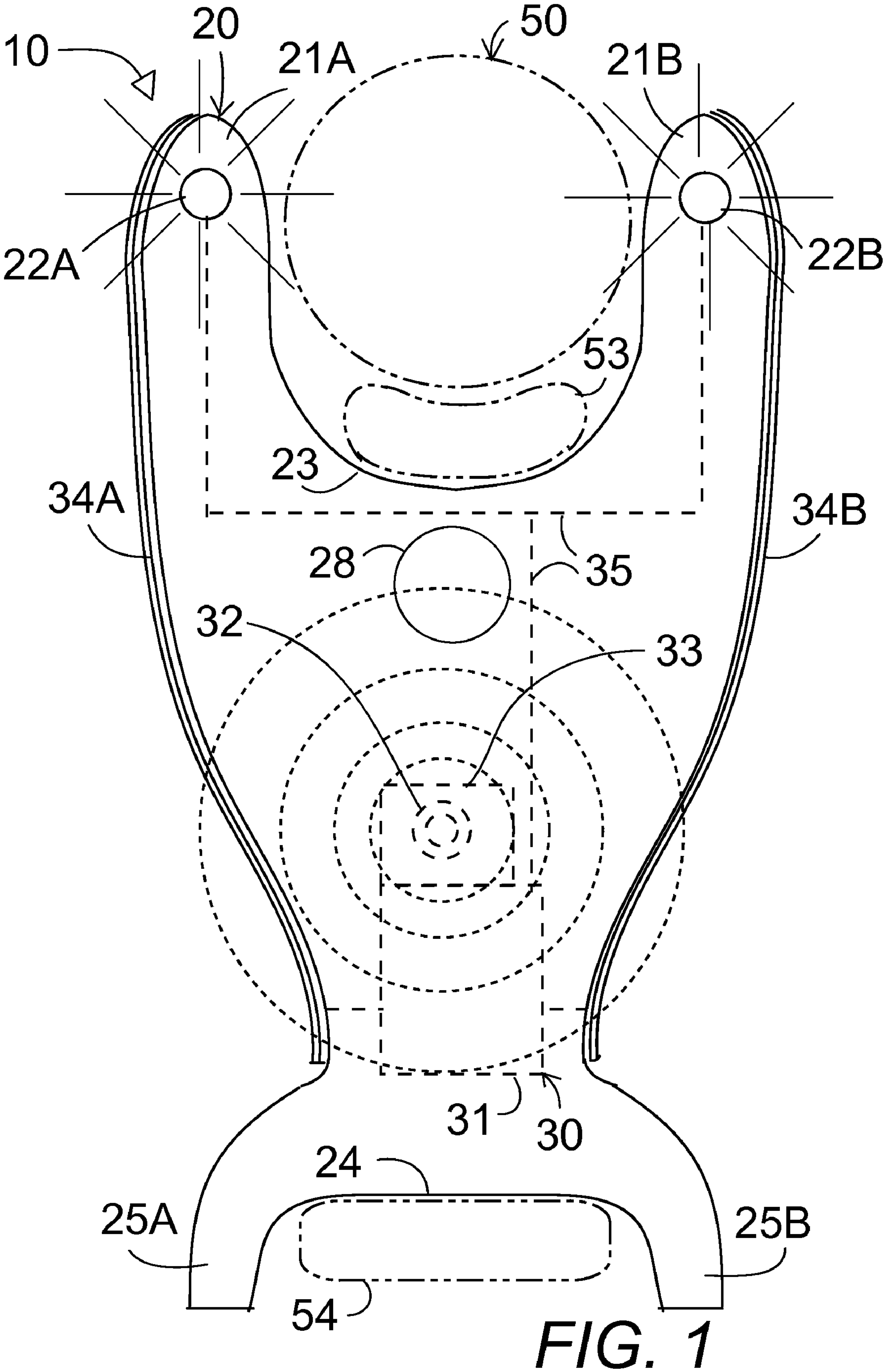
FIG. 1 is a front elevational view of the removable retainer device of the present invention showing the visual warning lights and audible warning activated by the static electricity potential sensing circuit with a sensing antenna on each outer edge of the retainer device and showing the device in place on a fuel nozzle handle securing the fuel nozzle control lever up in the fuel pumping position with the retainer device wedged between the control lever at the top and the fuel nozzle handle guard at the bottom.
Figure 2:
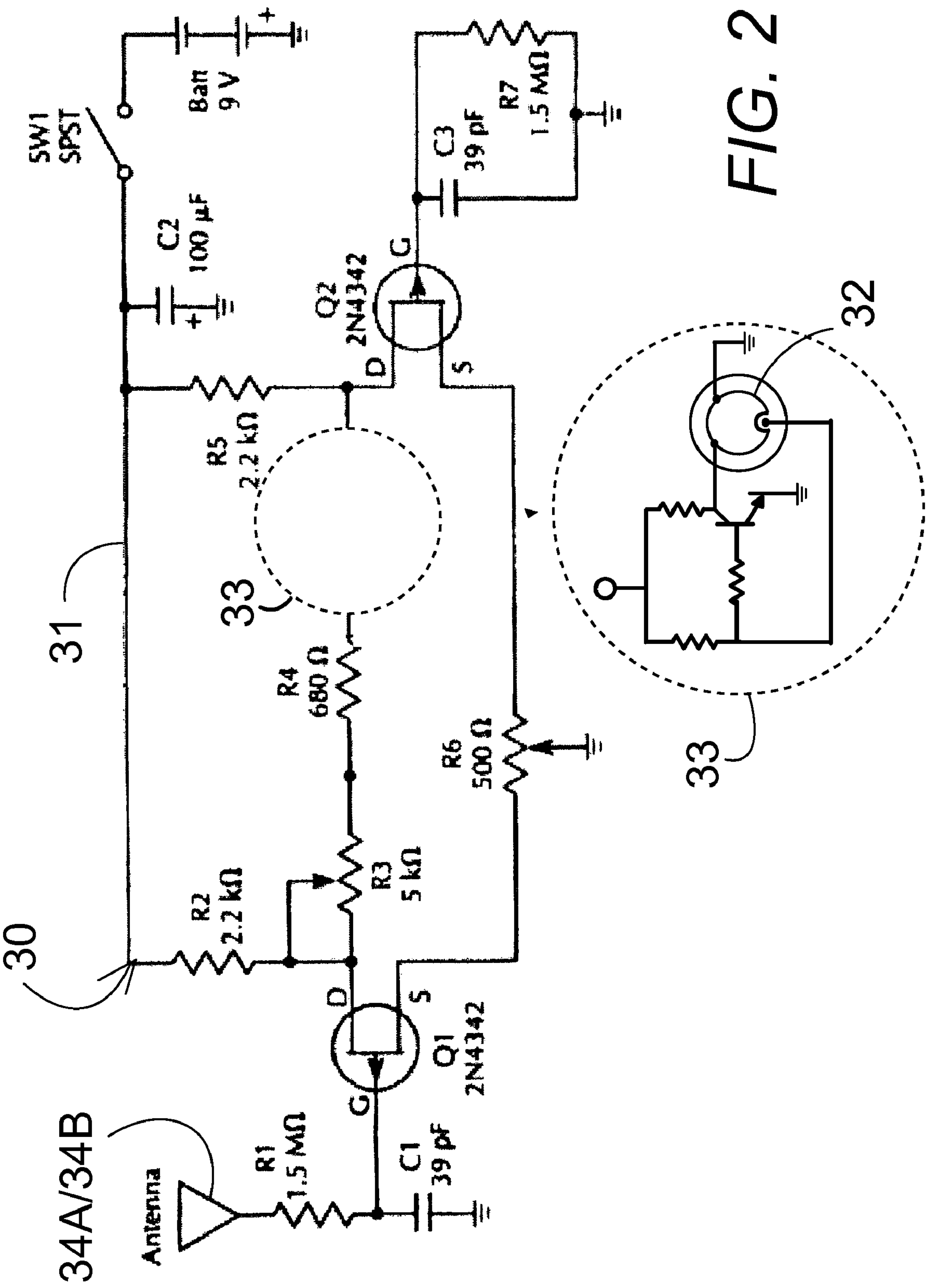
FIG. 2 is a diagrammatic view of a static electricity potential sensing circuit of the present invention.

In FIGS. 1 and 2, a removable retainer device 10 for an activating lever 53 on a fuel pump nozzle handle 50 has a static electricity potential detection component 30 and visual warning signals 22A and 22B and an audible warning signal 32.

In FIG. 1, a brace 20 retains the fuel pump nozzle handle activating lever 53 up in an on position to maintain the fuel flow through the nozzle. The brace 20 comprises a planar rigid body having a top surface 23 for engaging the activating lever 53 and a bottom surface 24 for engaging a bottom hand shield portion 54 of the fuel pump nozzle handle 50. A side portion, including upwardly protruding sections 21A and 21B and downwardly protruding sections 25A and 25B, protruding laterally outwardly beyond each of the two sides of the pump nozzle handle. The brace 20 is wedged between the activating lever 53 and the hand shield portion 54 to activate the flow of fuel through nozzle and to retain the nozzle handle lever in a first position for pumping the fuel. The brace is alternately removed therefrom to release the activating lever 53 to deactivate the flow of fuel through the nozzle. A magnet 28 or other attaching device may be mounted on the outside of the brace 20 for storing the brace magnetically or otherwise attached to a metal or other portion of the vehicle, such as on an inside surface of the fuel tank cover.

In FIGS. 1 and 2, a static electricity sensing system 30 is built into the brace 20. A static electricity sensing antenna 34A and 34B extends along the length of an outer edge of each protruding side portion of the brace. A static electricity sensing circuit 31 is housed within the brace 20. The sensing circuit 31 communicates with the sensing antennae 34A and 34B to detect the presence of a static electricity potential on a hand of a user approaching the fuel pump nozzle handle 50 before the hand of the user reaches the fuel pump nozzle handle.

A visual warning signal 22A and 22B, such as a light emitting diode is attached to each of the protruding side portions in an outwardly visible location. The visual warning signals communicate, such as by wires 35, with the static electricity sensing circuit 31. The visual warning signals 22A and 22B are activated by the sensing circuit 31 upon the sensing of a static electricity potential by the sensing circuit.

An audible warning signal 32, such as a piezo-electric audible signal device is attached to the brace and communicates with the static electricity sensing circuit. The audible warning signal 32 is activated upon sensing of static electricity potential by the sensing circuit 31 through a signal circuit 33.

The device preferably comprises both the visual warning signal comprising at least one light emitting diode 22A and 22B and the audible warning signal 32 comprising a piezo-electric sounding device built into the sensing circuit.

The two upwardly protruding sections 21A and 21B of the side portions on each side of the fuel nozzle handle lever straddle the fuel nozzle handle lever 53 and nozzle handle 50 to assist in retaining the brace 20 in place. The upwardly protruding sections house at least one of the visual warning devices 22A and 22B each positioned away from the fuel pump nozzle handle 50 in a highly visible location.

The two downwardly protruding sections 25A and 25B of the side portions on each side of the fuel nozzle handle hand shield portion 54 straddling the hand shield portion to assist in retaining the brace in place.

In use, the brace 20 is wedged in the fuel nozzle handle to maintain the fuel activating lever 53 in a fuel pumping position while pumping fuel into the fuel tank of the vehicle and alternate removed for storage. During pumping if a user approaches the brace 20 while the user's body has static electricity potential the visual signals 22A and 22B and the audible signal 32 will activate to notify the user to release the static electricity potential, such as by touching the roof of the vehicle prior to grasping the fuel nozzle handle thereby preventing a fire or explosion of the fuel fumes.

It is understood that the preceding description is given merely by way of illustration and not in limitation of the invention and that various modifications may be made thereto without departing from the spirit of the invention as claimed.

What is claimed is:

1. A removable retainer device for an activating lever on a fuel pump nozzle handle having a static electricity detection element and warning signal, the device comprising:

a brace for retaining a fuel pump nozzle handle lever in an on position, the brace comprising a planar rigid body having a top surface for engaging a fuel pump nozzle handle activating lever and a bottom surface for engaging a bottom hand shield portion of the fuel pump nozzle handle, a side portion protruding laterally outwardly beyond each of the two sides of the pump nozzle handle, the brace inserted between the nozzle handle lever and the hand shield to activate the flow of fuel through nozzle and to retain the nozzle handle lever in a first position for pumping the fuel, and the brace alternately removed therefrom to release the nozzle handle lever to deactivate the flow of fuel through the nozzle;

a static electricity sensing system built into the brace comprising:

a static electricity sensing antenna extending along the length of an outer edge of each protruding side portion of the brace:

a static electricity sensing circuit housed within the brace, the sensing circuit communicating with the sensing wire to detect presence of a static electricity potential on a hand of a user approaching the fuel pump nozzle handle before the hand of the user reaches the fuel pump nozzle handle;

a visual warning signal attached to each of the protruding side portions in an outwardly visible location, the visual warning signal communicating with the static electricity sensing circuit, the visual warning signal activated by the sensing circuit upon sensing of static electricity potential by the sensing circuit;

an audible warning signal attached to the brace, the audible warning signal communicating with the static electricity sensing circuit, the audible warning signal activated upon sensing of static electricity potential by the sensing circuit; thereby providing a removable retainer device for an activating lever on a fuel pump nozzle handle having a static electricity detection element and warning signals to warn the user not to touch the fuel pump hand and thereby prevent a spark being generated between the hand of the user and the fuel pump handle to prevent ignition of combustible vapors in the vicinity of the fuel pump handle.

2. The device of claim 1 wherein the warning device comprises a visual warning signal attached to each of the protruding side portions in an outwardly visible location, the visual warning signal communicating with the static electricity sensing circuit, the visual warning signal activated by the sensing circuit upon sensing of static electricity potential by the sensing circuit.

3. The device of claim 2 wherein the visual warning signal comprises at least one light emitting diode attached to each of the protruding side portions.

4. The device of claim 1 wherein the warning device comprises an audible warning signal attached to the brace, the audible warning signal communicating with the static electricity sensing circuit, the audible warning signal activated upon sensing of static electricity potential by the sensing circuit.

5. The device of claim 4 wherein the audible warning signal comprises a piezo electric sounding device built into the sensing circuit.

6. The device of claim 1 wherein the warning device comprises a visual warning signal attached to each of the protruding side portions in an outwardly visible location, the visual warning signal communicating with the static electricity sensing circuit, the visual warning signal activated by the sensing circuit upon sensing of static electricity potential by the sensing circuit, and an audible warning signal attached to the brace, the audible warning signal communicating with the static electricity sensing circuit, the audible warning signal activated upon sensing of static electricity potential by the sensing circuit.

7. The device of claim 6 wherein the visual warning signal comprises at least one light emitting diode attached to each of the protruding side portions and the audible warning signal comprises a piezo electric sounding device built into the sensing circuit.

8. The device of claim 1 wherein the brace further comprises two upwardly protruding sections of the side portions on each side of the fuel nozzle handle lever straddling the fuel nozzle handle lever to assist in retaining the brace in place.

9. The device of claim 1 wherein each upwardly protruding section houses at least one of the visual warning devices positioned away from the fuel pump nozzle handle in a highly visible location.

10. The device of claim 1 wherein the brace further comprises two downwardly protruding sections of the side portions on each side of the fuel nozzle handle hand shield portion straddling the hand shield portion to assist in retaining the brace in place.

11. The device of claim 1 further comprising means for attaching the brace to the vehicle when not in use.

12. The device of claim 11 wherein the means for attaching the brace to the vehicle comprises a magnet mounted on the outside of the brace.

* * * * *